June 13, 1944.  M. W. MORGAN  2,351,445
REFINING MINERAL OIL WITH CLAY
Filed May 29, 1941
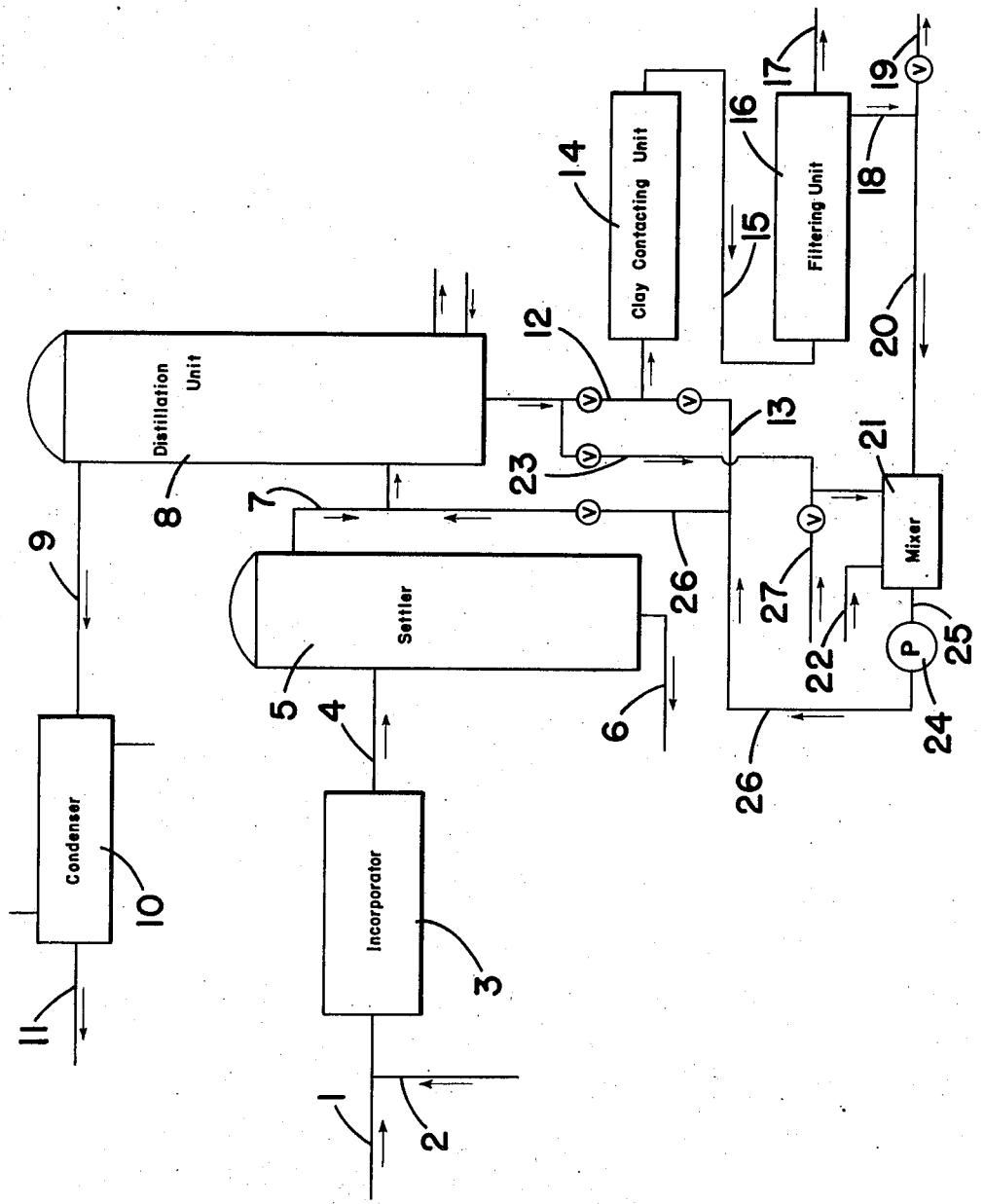
Maurice W. Morgan, INVENTOR.
BY P. J. Whelan
ATTORNEY Patented June 13, 1944

2,351,445

UNITED STATES PATENT OFFICE 2,351,445

REFINING MINERAL OILS WITH CLAY

Maurice W. Morgan, Goose Creek, Tex., assignor to Standard Oil Development Company, a corporation of Delaware Application May 29, 1941, Serial No. 395,797

6 Claims. (Cl. 196—147)

The present invention is directed to an improved method for treating lubricating oils. More particularly, it relates to a more efficient and economical utilization of clay in the neutralization and decolorization of lubricating oils, especially oils that have been deasphaltized or acid treated in propane (or naphtha) solution.

It is well known in the art to deasphalt and/or deresin lube stocks, both distillates and residuums and especially the latter, by dissolving them in liquefied normally gaseous hydrocarbons such as propane. The liquefied normally gaseous hydrocarbon dissolves the desirable constituents and rejects as a precipitate the asphaltic and/or resinous material. It is also known to treat lube stocks (distillates or residuums) with sulfuric acid while they are dissolved in naphtha or propane. This procedure usually effects removal of substantially all asphaltic, sludgy and resinous materials from the oil. Furthermore, it is known to subject oils treated by either of these methods to further refining such as dewaxing in propane or naphtha solution for improvement of "pour" properties as well as treating with clay, either in the presence or absence of a diluent, for neutralization and improvement of color characteristics. The art on clay treatment of oils embraces not only the utilization of natural and activated clays but also the utilization of regenerated clays, both natural and activated. The term "activated clays" has reference to natural clays which have been treated with sulfuric or hydrochloric acid for improvement of their decolorizing properties. However, it was thought heretofore that it would be impossible to utilize, in the neutralization and decolorization of oils, clays which have previously been used for this purpose without having first regenerated them. Generally, this supposition is a matter of fact in the case of clays which have been utilized in the treatment of oils containing asphaltic or resinous materials since these latter materials tend to accumulate on the surfaces of the clay particles and thereby greatly retard or destroy their ability to neutralize and decolorize oils.

It has now been discovered that clays which have previously been used to neutralize and decolorize oils substantially free of asphaltic and resinous-like materials may be re-used in admixture with fresh clay for this same purpose without having first been regenerated. The ratio of unregenerated used clay to fresh clay in a mixture of same which is employed for neutralizing and decolorizing oils preferably ranges between about 0.5:1 and 2:1. Utilization of recycled, unregenerated, used clay in this manner effects savings in the total quantity of clay required for treating a given amount of oil and in the quantity of oil lost as "soakage" in the clay.

The nature of the present invention will be more clearly understood by reference to the attached drawing which illustrates one modification of the invention.

Referring now to the drawing in detail, 1 represents a line through which deasphalted and dewaxed oil, in propane solution, is discharged from the dewaxing stage (not shown) of a propane deasphalting, dewaxing and acid treating plant. By means of line 2, there is introduced into the oil-propane solution flowing through line 1 an amount of 98% sulfuric acid equivalent to approximately 20 to 50 pounds of acid per barrel of dewaxed oil on a propane-free basis. This mixture of oil-propane solution and acid is then passed through an incorporator 3, or equivalent means for insuring intimate contact between the two liquids, before being discharged into settler 5 by means of line 4. In settler 5, the oil-propane phase separates from the acid phase and the latter is withdrawn through line 6 and may be disposed of in any desirable manner.

The acid-treated oil-propane phase separated in settler 5 is withdrawn through line 7 and passed to propane stripper 8 wherein propane is separated and removed as a gas through line 9 and is subsequently liquefied in condenser 10 for recycling through line 11 to the deasphalting or dewaxing stages which are not shown in the drawing. One or more compressors may be substituted for condenser 10; however, it is preferable to operate propane stripper 8 at a sufficiently high temperature and pressure to permit liquefying the propane by simply cooling it with water.

The depropanized oil is withdrawn from propane stripper 8 and passed to clay contacting unit 14 by means of line 12. As the oil flows through line 12, contact clay is admixed with it in an amount equivalent to approximately 0.2 to 0.5 pound of clay per gallon of oil. This clay is preferably introduced in the form of an oil slurry through branch line 13 which is in communication with line 12; however, in some instances, it may be desirable to inject the clay into line 12 by means of a hopper or any other mechanical device suitable for the purpose. The oil and clay mixture in contacting unit 14 is agitated and is heated to a temperature, in the range between about 300° and 450° F., which is optimum for the oil being treated and the mixture is maintained at that temperature for a time sufficient to secure the desired neutralization and color improvement in the oil (usually about 30 minutes) before it is discharged through line 15 to filtering unit 16. The optimum temperature for contacting oil with clay varies with the type of oil being treated; it is approximately 350° F. for distillates and 425° F. for residuums.

Filtering unit 16 preferably comprises one or more filter presses (such as the Sweetland type) but other equivalent means of removing the contact clay from the oil may be employed if desired. In filtering unit 16, the clay is separated from the finished oil and the latter passed to storage through line 17. The used contact clay is withdrawn from filtering unit 16 by means of line 18 which preferably is equipped with a screw conveyor to aid in the transportation of the clay. Part of the used clay, preferably about 50 per cent, is discarded from the system by means of line 19; the balance is recycled through line 20 to mixer 21 where it is incorporated into a slurry comprising about an equal quantity (equivalent to the amount of used clay discarded from the system) of fresh clay, introduced by means of line 22, and a sufficient quantity of acid oil, withdrawn from line 12 and introduced into mixer 21 by means of line 23, to render it fluidal for pumping. This oil slurry of clay is then introduced into line 12, ahead of contacting unit 14, by means of pump 24 and lines 25 and 13. In some instances, particularly when starting up an operation as has been described herein, it may be desirable and preferable to employ a finished oil similar to that obtained from filtering unit 16 by means of line 17 for making up the oil-clay slurry. In this case, treated oil is introduced into line 23 through line 27 and admixes with clay from line 22 in mixer 21.

Although it generally is preferable to inject the clay slurry into the acid oil after the latter has been depropanized in stripper 8, there may be some instances when it would be desirable to inject at least a portion of the clay slurry into the acid oil ahead of stripper 8, particularly since it is known that clay often will prevent fouling of heat exchange equipment in contact with acid oil. When desired, any portion of the clay slurry passing through line 25 may be diverted from line 13 to line 7 by means of line 26. The clay injected into line 7, by means of line 26, passes (along with the oil) through stripper 8 into line 12 where it combines with the other portion of the clay slurry introduced through line 13.

The following examples are presented for purpose of illustrating the feasibility of utilizing unregenerated, used clay in admixture with fresh clay for treating lubricating oils which are substantially free of asphaltic and resinous-like constituents. Hence, these examples are not to be construed as limiting the invention in any manner whatsoever.

EXAMPLE 1

A Panhandle motor oil distillate having a Saybolt Universal viscosity of 74 seconds at 210° F. was dewaxed and then treated in propane solution with 28 pounds of 98% sulfuric acid per barrel of propane-free oil. After removing the propane, a portion of the acid treated oil was contacted with 0.3 pound of Milwhite No. 2 clay per gallon at a temperature of 350° F. for 30 minutes and then filtered. One-third of the used clay obtained in this operation was discarded and the balance was mixed with fresh clay in an amount equivalent to the used clay discarded; the resultant clay mixture was then utilized to treat additional portions of the acid oil in the manner previously described. By repeatedly using and refreshing the clay in this manner, it was utilized consecutively in treating six separate batches of the oil. It will be noted from the data, given in Table I below, that this procedure did not cause an appreciable degradation in the quality of the latter batches of treated oils and that the mixture of used and fresh clay was practically as good as fresh clay for neutralizing and decolorizing this lube distillate which was substantially free of asphaltic and sludgy constituents when brought in contact with the clay.

Table I

| | 1st contact | 2nd contact | 3rd contact | 4th contact | 5th contact | 6th contact |
|---|---|---|---|---|---|---|
| Color, Tag-Robinson | 9¾ | 9½ | 9½ | 9½ | 9¼ | 9¼ |
| Colorhold (16 hrs. at 212° F.), T-R | 9 | 9¼ | 9¼ | 9¼ | 9¼ | 9¼ |
| Neutralization No | 0.02 | 0.02 | 0.02 | 0.02 | 0.03 | 0.03 |

For purpose of comparison, another sample of the previously-described Panhandle motor oil distillate was dewaxed in propane solution, the propane was removed from the oil and the latter was then treated with 28 pounds of 98% sulfuric acid per barrel. After settling and removing the sludge, a portion of the acid treated oil was contacted with 0.3 pound of Milwhite No. 2 clay per gallon at a temperature of 350° F. for 30 minutes and then filtered. In following the procedure employed in the previous case, one-third of the used clay obtained from this operation was discarded and the balance was mixed with fresh clay in an amount equivalent to the clay discarded. This clay mixture was then contacted with another batch of the conventionally acid treated oil; after which it was again mixed with fresh clay and utilized in contacting a third batch of acid oil. The data obtained on the three batches of oils treated in this manner are given in Table II below. It will be noted that the quality of the clay treated oils grew progressively worse as the used clay, in admixture with fresh clay, was utilized for the second and third times. The failure of the clay to satisfactorily neutralize and decolorize the oil after repeated uses in this case was attributed to the presence of sludgy, asphaltic materials in the oil being contacted therewith. These sludgy materials collected on the surfaces of the clay particles and rendered them inactive.

Table II

| | 1st contact | 2nd contact | 3rd contact |
|---|---|---|---|
| Color, Tag-Robinson | +9+ | 3 | 1¾ |
| Colorhold (16 hrs. at 212° F.), T-R | 5 | 1½ | 1 |
| Neutralization No | 0.035 | 0.07 | 0.10 |

EXAMPLE 2

A heavy Panhandle-crude residuum was deasphalted, dewaxed and then acid treated in propane solution, using 35 pounds of 98% sulfuric acid per barrel of oil on a propane-free basis. The resultant acid oil, still in propane solution, was then divided into two portions to be separately treated with clay by methods described hereinafter.

To one portion of propane solution of acid oil there was added approximately 0.3 pound of Milwhite No. 2 contact clay per gallon of oil on a propane-free basis. This mixture was then agitated and heated to a contacting temperature of 320° F. which was maintained for approximately 30 minutes before the mixture was filtered. During the heating of the mixture, the propane was allowed to evaporate and escape freely from the oil; hence, the greater part of the clay contacting of the oil was carried out in the substantial absence of propane. Thirty-three per cent of the used clay obtained in this operation was discarded and the balance was mixed with fresh clay in an amount equivalent to the used clay discarded. The resultant clay mixture was then utilized to treat an additional amount of the acid oil (in propane solution) in the manner previously described. In this manner, the used clay was recycled and re-used in admixture with fresh clay (in concentrations of 29%, 28% and 26%, respectively) for three additional and consecutive contacts with fresh acid oil. Operating and inspection data obtained in this experiment are given in Table III below:

Table III

|  | Run No. | | | | |
|---|---|---|---|---|---|
|  | 1 | 2 | 3 | 4 | 5 |
| *Operating data* | | | | | |
| Clay dosage_____lbs./gal__ | 0.27 | 0.37 | 0.29 | 0.26 | 0.28 |
| First-thru clay_____per cent__ | 100.0 | 33.0 | 29.0 | 28.0 | 26.5 |
| Second-thru clay_____do____ | | 67.0 | 23.4 | 20.9 | 20.6 |
| Third-thru clay_____do____ | | | 47.6 | 16.8 | 15.4 |
| Fourth-thru clay_____do____ | | | | 34.3 | 12.3 |
| Fifth-thru clay_____do____ | | | | | 25.2 |
| Oil in clay after contact_____do____ | 41.8 | 38.9 | 37.6 | 34.8 | |
| Contact temperature_____°F__ | 320 | 320 | 320 | 320 | 320 |
| *Inspection data* | | | | | |
| Color, Tag-Robinson_____ | 2 | 2 | 2 | 1¾ | 1¾ |
| Colorhold (16 hrs. at 250° F.), T-R_ | 1½ | 1⅜ | 1½ | 1¼ | 1¼ |
| Viscosity at 210° F., S. U. S_____ | 170 | 168 | 165 | 170 | 165 |
| Carbon_____per cent__ | 1.45 | 1.39 | 1.16 | 1.29 | 1.45 |
| Neutralization No_____ | 0.03 | 0.03 | 0.03 | 0.03 | 0.03 |

The second portion of acid oil in propane solution was first depropanized and then contacted with clay in essentially the same manner described in the preceding paragraph, except that propane was not present during any part of the contacting of the acid oil with clay and that the contact temperature employed was 420° F. instead of 320° F. The operating and inspection data are given in Table IV.

Table IV

|  | Run No. | | | | |
|---|---|---|---|---|---|
|  | 1 | 2 | 3 | 4 | 5 |
| *Operating data* | | | | | |
| Clay dosage_____lbs./gal__ | 0.27 | 0.37 | 0.29 | 0.26 | 0.28 |
| First-thru clay_____per cent__ | 100.0 | 33.0 | 29.0 | 28.0 | 26.5 |
| Second-thru clay_____do____ | | 67.0 | 23.4 | 20.9 | 20.6 |
| Third-thru clay_____do____ | | | 47.6 | 16.8 | 15.4 |
| Fourth-thru clay_____do____ | | | | 34.3 | 12.3 |
| Fifth-thru clay_____do____ | | | | | 25.2 |
| Contact temperature_____°F__ | 420 | 420 | 420 | 420 | 420 |
| *Inspection data* | | | | | |
| Color, Tag-Robinson_____ | 1¾ | 2 | 2 | 1¾ | 1¾ |
| Colorhold (16 hrs. at 250° F.), T-R_ | 1½ | 1⅜ | 1½ | 1⅜ | 1¼ |
| Viscosity at 210° F., S. U. S_____ | 167 | 167 | 169 | 170 | 171 |
| Carbon_____per cent_ | 1.18 | 1.11 | 1.21 | 1.26 | 1.18 |
| Neutralization No_____ | 0.03 | 0.03 | 0.03 | 0.03 | 0.03 |

The data presented in Tables III and IV show that residual crude fractions which have been deasphalted, dewaxed and acid treated in propane solution may be finished to satisfactory lube oil quality by contacting them with a mixture of recycled and fresh clay at a temperature in the range between 320° and 420° F. The data also show that the clay mixture may be injected into the oil either before or after removal of the propane with about equal success.

While this invention has been described and illustrated when employing Milwhite No. 2 contact clay as the neutralizing and decolorizing agent, it is to be clearly understood that any clay having similar physical characteristics may be employed. Thus, clays known in the trade as Milwhite No. 1, Filtrol PJ-5, and others may be used with good results.

This invention has also been described and illustrated with reference to specific methods of removing asphaltic, sludgy and resinous-like constituents from oils to condition them for treatment with contact clay in the manner described hereinbefore. However, it should be clearly understood that other well known means of removing these undesirable constituents may be employed in preconditioning the oil for the clay treatment. The preferable method of preconditioning the oil varies somewhat with the stock to be treated. In some cases, it may be preferable to employ selective solvent extraction; whereas, in other cases, it may be more desirable to use selective solvent precipitation. Another common and satisfactory method, particularly in the case of distillates, is to treat the oil with sulfuric acid in the presence of a suitable diluent, such as naphtha or a liquefied normally gaseous hydrocarbon. When treating oils containing relatively large quantities of asphaltic constituents, such as residuums, it may be preferable to employ two or more of these or other methods in combination to effect the removal of substantially all the asphaltic, sludgy and resinous-like constituents.

This process may be employed in many modifications without departing from the spirit and scope of the invention. Thus, if the oil undergoing clay treatment is substantially free of asphaltic, sludgy and resinous materials, recycling of a portion of the used clay from one contact operation to a second, third, fourth, fifth, or more contacts may be employed with success.

The nature and objects of the present invention having thus been described, what is claimed as new and novel and what is desired to be protected by Letters Patent is:

1. A process for decolorizing and neutralizing a mineral oil substantially free of asphaltic, sludgy and resinous materials which comprises contacting the oil with clay reagent under conditions of time, temperature and quantity of reagent sufficient to give the desired quality improvement in the oil, filtering the clay from the oil, discarding between ⅓ and ½ of the used contact clay separated from the oil and replacing it with fresh contact clay, and recycling this mixture of unregenerated used and fresh clays for use as the clay reagent in the treatment of additional portions of the oil.

2. A process in accordance with claim 1 wherein the oil is preconditioned for clay treatment by subjecting it to deasphalting, dewaxing and acid treatment while in solution with a liquefied normally gaseous hydrocarbon.

3. A process in accordance with claim 1 wherein the oil is preconditioned for clay treatment by deasphalting, dewaxing and acid treating it in propane solution.

4. A process in accordance with claim 1 wherein the oil is preconditioned for clay treatment by dewaxing and acid treating it in solution with a diluent.

5. A process in accordance with claim 1 wherein the oil is preconditioned for clay treatment by acid treating it in solution with a diluent.

6. A process in accordance with claim 1 wherein the oil is preconditioned for clay treatment by selectively solvent extracting it for removal of asphaltic and resinous materials.

MAURICE W. MORGAN.